United States Patent Office 3,606,602
Patented Sept. 20, 1971

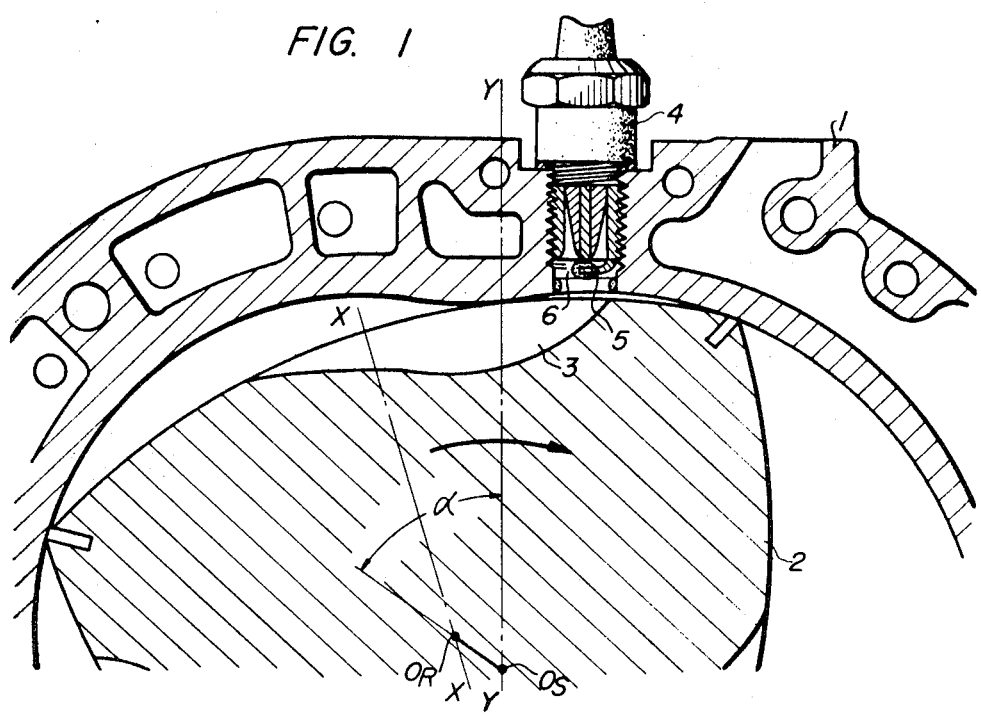
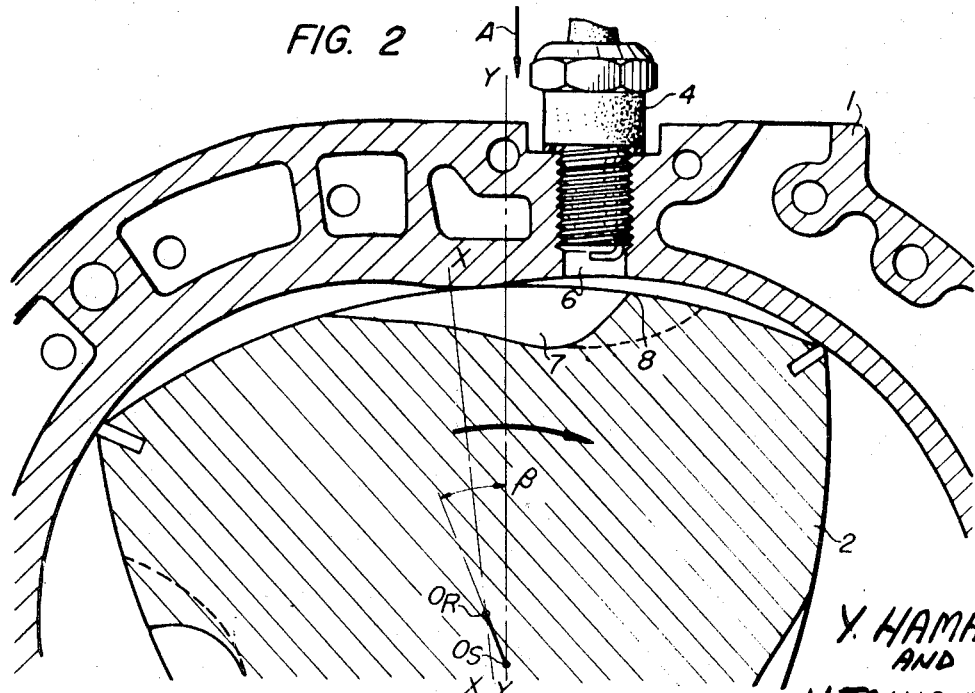

3,606,602
COMBUSTION CHAMBER OF ROTARY PISTON ENGINE
Yoshitugu Hamada and Noritoshi Taniguchi, Nagahama-shi, Japan, assignors to Yanmar Diesel Engine Co., Ltd., Osaka, Japan
Filed Oct. 23, 1969, Ser. No. 868,848
Claims priority, application Japan, Nov. 15, 1968, 43/99,071
Int. Cl. F01c 1/02, 1/42
U.S. Cl. 418—61          3 Claims

ABSTRACT OF THE DISCLOSURE

A recess having the leading end portion thereof bifurcated is formed in each section of the rotor at such a location that the time when said recess is brought into communication with an inner opening of the ignition plug mounting hole in the cylindrical housing coincides or substantially coincides with the time when the ignition plug sparks.

BACKGROUND OF THE INVENTION

Field of the invention

The present invention relates to a combustion chamber of a rotary piston engine having a cylindrical housing and a piston (rotor) disposed in said housing for rotation therein.

Description of the prior art

In the operation of a rotary piston engine, carbonized substance of fuel and lubricating oil and/or compounds of the additives contained in said fuel and lubricating oil deposit in the ignition plug or in the opening of the ignition plug mounting hole formed in the housing. These compounds are heated by the combustion gas to a temperature sufficiently high to ignite a fuel-air mixture when the latter is brought into contact therewith. Therefore, the fuel-air mixture is frequently ignited by the heated deposit before the ignition plug sparks. Such preignition is generally quite detrimental to the engine.

SUMMARY OF THE INVENTION

The present invention proposes a configuration of the combustion chamber which obviates the preignition of the fuel-air mixture.

According to the present invention, there is provided a combustion chamber of a rotary piston engine comprising a cylindrical housing, a piston (rotor) disposed in said cylindrical housing for rotation therein and an ignition plug, said combustion chamber being formed by a recess formed in each section of the outer surface of said piston at such a location and bifurcated at its leading end in such a manner that the time when the recess is brought into communication with the inner opening of the ignition plug mounting hole coincides or substantially coincides with the time when the ignition plug sparks.

BRIEF DESCRIPTION OF THE DRAWING

The present invention will be described in detail hereunder with reference to the accompanying drawings, in which:

FIG. 1 is a fragmentary sectional view of a conventional rotary piston engine, showing the configuration of a recess formed in the rotor and the position of an ignition plug relative to said recess;

FIG. 2 is a fragmentary sectional view, similar to FIG. 1, of an engine in which the present invention is embodied.

DESCRIPTION OF THE PREFERRED EMBODIMENT

Figure 3:
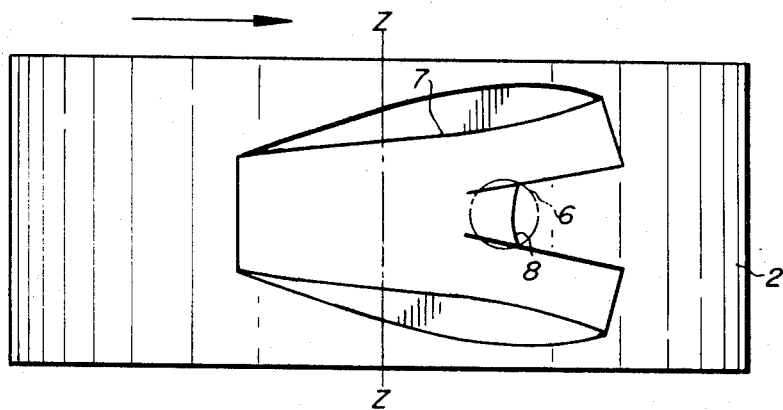
FIG. 3 is a view of the rotor as viewed in the direction of arrow A in FIG. 2.

Referring first to FIG. 1 there is shown the configuration of a combustion chamber of the conventional rotary piston engine. In FIG. 1, reference numeral 1 designates a cylindrical housing and 2 designates a rotor rotatably mounted in said cylindrical housing and having a recess 3 formed in each section of the outer surface thereof. Reference numeral 4 designates an ignition plug. The center of rotation of the engine shaft is indicated by $O_S$ and the center of rotation of the rotor by $O_R$. The engine shaft and the rotor rotate in the direction of arrow. At the top dead center of this engine, the center of rotation of the rotor is located on an axis Y—Y. Therefore, in the position shown, the rotor is located at an angle of α before the engine reaches its top dead center. On the other hand, the combustion chamber-constituting recess formed in the outer surface of the rotor displaced in the rotating direction of the rotor with respect to the center line X—X of said surface and it is known through experiment that such an arrangement is effective for achieving high engine output and low fuel consumption.

When the engine is operated for an extended period, the carbonized substance formed due to incomplete combustion of fuel and lubricating oil and/or the compounds of the additives contained in said fuel and lubricating oil deposit on an electrode 5 of the ignition plug and in the opening 6 of the ignition plug mounting hole formed in the housing, and are heated by the combustion gas. It has been found that when the deposit of these compounds has been heated to a temperature high enough to ignite the fuel-air mixture, the fuel-air mixture starts to burn at the moment when the recess formed in the rotor has reached the opening 6 as shown in FIG. 1.

As stated previously, the recess formed in the rotor is displaced in the rotating direction of the rotor with respect to the center line of the outer surface of the rotor to obtain a satisfactory engine performance. Thus, it will be appreciated that the time when the recess in the rotor is brought into communication with the opening 6 of the ignition plug mounting hole and the fuel-air mixture is ignited by the heated deposit formed in said opening is considerably earlier than the time when the ignition plug 4 sparks. This is the cause of the so-called preignition.

FIGS. 2 and 3 show the configuration of a recess formed in the rotor, according to the present invention, which avoids the preignition as described above and enables a high engine performance to be obtained.

FIG. 2 shows the position of the engine at the moment when the recess 7 formed in the rotor is brought into communication with the opening 6 of the ignition plug mounting hole and the fuel-air mixture is ignited by the heated deposit. FIG. 3 shows the relative position of the recess 7 and opening 6 of the ignition plug mounting hole as viewed in the direction of arrow A shown in FIG. 2.

According to the present invention, as shown in FIGS. 2 and 3, the leading edge of the recess 7 is displaced in a direction opposite to the rotating direction of the rotor as at 8, only at a portion which is brought into register with the peripheral edge of the opening 6. Therefore, the time when the recess 7 is communicated with the opening 6 is delayed as compared with the time when the recess of the configuration shown in FIG. 1 is communicated with the same. Namely, the recess 7 is communicated with the opening 6 when the rotor is positioned at an angle of β before the engine reaches its top dead point. Therefore, if the angle β is selected to be the same or substantially the same as that at which the ignition plug sparks, the fuel-air mixture will be ignited at the same time or at substantially the same time as the sparking of the ignition plug, even if the deposit formed in the ignition plug or in the opening of the ignition plug mounting hole has been heated to a temperature high enough to ignite said fuel-air mixture, and thus the detrimental preignition can be avoided.

In this case also, the recess should be formed in such a manner that a more than half of its volume be located in the rotating direction of the rotor relative to the center line of the rotor surface (indicated by the line Z—Z in FIG. 3) so as to obtain a high engine performance, and this can be attained by bifurcating the leading end portion of the recess as shown in FIG. 3.

We claim:

1. An internal combustion engine of the spark-ignition, rotary piston type, comprising a housing defining a trochoidal shaped piston chamber and a corresponding rotary piston mounted therein, a spark-plug mounting hole in said housing extending into said chamber, said piston comprising a plurality of outermost surfaces circumferentially succeeding each other, a recess in each of said surfaces arranged to periodically register with said hole pursuant to rotation of said piston, each said recess defining a combustion chamber when in communication with said hole, characterized in that the ignition timing of the engine and the configuration and arrangement of said recesses on said piston are such that each said recess begins to communicate with said hole substantially simultaneously with the sparking of the spark plug.

2. The engine of claim 1, wherein each said recess at its leading end diverges into two spaced apart recess legs which diverge away from each other and to opposite sides of said hole whereby said hole first communicates with said recess only after more than 50% of the volume of said recess has passed the top dead center position of said rotor.

3. The engine of claim 2, wherein said hole is displaced from the minor axis of said chamber in the direction of rotation of said piston.

References Cited

UNITED STATES PATENTS

| 3,244,154 | 4/1966 | Lohner | 123—8.11 |
| 3,245,388 | 4/1966 | Froede et al. | 123—8.09 |
| 3,283,750 | 11/1966 | Lohner | 123—8.11 |
| 3,319,610 | 5/1967 | Hejj et al. | 123—8.11 |
| 3,398,724 | 8/1968 | Lamm et al. | 418—61 |

CARLTON R. CROYLE, Primary Examiner

W. V. GOODLIN, Assistant Examiner

U.S. Cl. X.R.

123—8.09, 8.11, 8.45